(12) United States Patent
Baruch et al.

(10) Patent No.: US 10,191,687 B1
(45) Date of Patent: Jan. 29, 2019

(54) ADAPTIVE SNAP-BASED REPLICATION IN A STORAGE SYSTEM

(71) Applicant: EMC IP Holding Company LLC, Hopkinton, MA (US)

(72) Inventors: Leehod Baruch, Rishon Leziyon (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 89 days.

(21) Appl. No.: 15/379,996

(22) Filed: Dec. 15, 2016

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01); *G06F 3/0659* (2013.01); *G06F 2201/84* (2013.01)

(58) Field of Classification Search
CPC ......... G06F 3/065; G06F 3/067; G06F 3/0619
USPC ........................................................ 711/162
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |

(Continued)

OTHER PUBLICATIONS

EMC Corporation, "EMC Recoverpoint/EX;" Applied Technology; White Paper; Apr. 2012; 17 Pages.

*Primary Examiner* — Jae U Yu
(74) *Attorney, Agent, or Firm* — Daly, Crowley, Mofford & Durkee, LLP (57) ABSTRACT

Described embodiments provide systems and methods for operating a storage system. The storage system receives write requests to be written to a production volume of the storage system during a snapshot interval. One or more system properties associated with at least one of the storage system and the received write requests are determined. One or more operating conditions of the storage system are determined. Based, at least in part, upon the determined one or more system properties and the determined one or more operating conditions, the snapshot interval is adapted. At completion of the snapshot interval, a snapshot replica is generated from data of the production volume and the received write requests, and the snapshot replica is sent to a replication volume of the storage system.

19 Claims, 8 Drawing Sheets

(56) References Cited

U.S. PATENT DOCUMENTS

| | | |
|---|---|---|
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B2 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | Benhanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |

(56) References Cited

U.S. PATENT DOCUMENTS

| | | |
|---|---|---|
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 2003/0101321 A1* | 5/2003 | Ohran ................. G06F 11/1451 711/162 |

* cited by examiner

ADAPTIVE SNAP-BASED REPLICATION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method including receiving write requests to be written to a production volume of a storage system during a snapshot interval. One or more system properties associated with at least one of the storage system and the received write requests are determined. One or more operating conditions of the storage system are determined. Based, at least in part, upon the determined one or more system properties and the determined one or more operating conditions, the snapshot interval is adapted. At completion of the snapshot interval, a snapshot replica is generated from data of the production volume and the received write requests, and the snapshot replica is sent to a replication volume of the storage system.

Another aspect provides a system that includes a processor and memory storing computer program code that when executed on the processor causes the processor to operate a storage system. The storage system is operable to perform the operations of receiving write requests to be written to a production volume of the storage system during a snapshot interval. One or more system properties associated with at least one of the storage system and the received write requests are determined. One or more operating conditions of the storage system are determined. Based, at least in part, upon the determined one or more system properties and the determined one or more operating conditions, the snapshot interval is adapted. At completion of the snapshot interval, a snapshot replica is generated from data of the production volume and the received write requests, and the snapshot replica is sent to a replication volume of the storage system.

Another aspect provides a computer program product including a non-transitory computer readable storage medium having computer program code encoded thereon that when executed on a processor of a computer causes the computer to operate a storage system. The computer program product includes computer program code for receiving write requests to be written to a production volume of the storage system during a snapshot interval. One or more system properties associated with at least one of the storage system and the received write requests are determined. One or more operating conditions of the storage system are determined. Based, at least in part, upon the determined one or more system properties and the determined one or more operating conditions, the snapshot interval is adapted. At completion of the snapshot interval, a snapshot replica is generated from data of the production volume and the received write requests, and the snapshot replica is sent to a replication volume of the storage system.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing concepts, structures, and techniques, some terms are explained. As used herein, the term "I/O request" or simply "I/O" may refer to an input or output request, for example a data read or a data write request. The term "storage system" may encompass physical computing systems, cloud or virtual computing systems, or a combination thereof. The term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN), etc.). The term "storage device" may also refer to a storage array including multiple storage devices.

Figure 1:
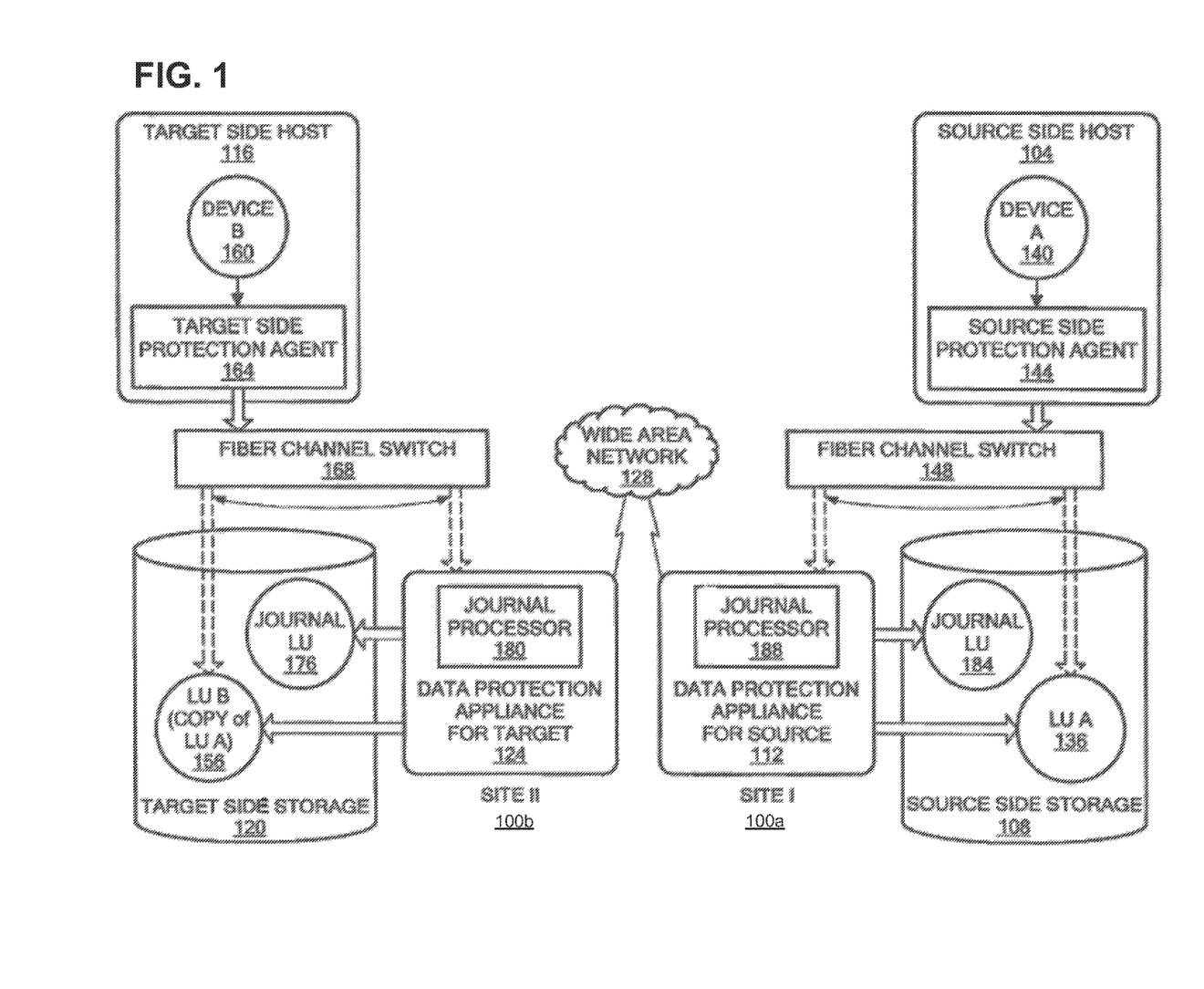
FIG. 1 is a block diagram of a data protection system, in accordance with an illustrative embodiment.

Referring to the illustrative embodiment shown in FIG. 1, data protection system 100 may include two sites, Site I 100a and Site II 100b, which communicate via a wide area network (WAN) 128, such as the Internet. In some embodiments, under normal operation, Site I 100a may correspond to a source or production site (i.e., the transmitter within a data replication workflow) of system 100 and Site II 100b may be a target or replication site (i.e., the receiver within a data replication workflow) of data protection system 100. Thus, during normal operations, the direction of replicated data flow may be from Site I 100a to Site II 100b.

In certain embodiments, Site I 100a and Site II 100b may be remote from one another. In other embodiments, Site I 100a and Site II 100b may be local to one another and may be connected via a local area network (LAN). Local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. For example, Site I 100a may behave as a target site and Site II 100b may behave as a source site. Failover may be triggered either manually (e.g., by a user) or automatically and may be performed in the event of a disaster at Site I 100a. In some embodiments, both Site I 100a and Site II 100b may behave as source site for some stored data and may behave simultaneously as a target site for other stored data. A portion of stored data may be replicated from one site to the other, and another portion may not be replicated.

Site I 100a may correspond to a production site (e.g., a facility where one or more hosts run data processing applications that write data to a storage system and read data from the storage system) and Site II 100b may correspond to a backup or replica site (e.g., a facility where replicated production site data is stored). In such embodiments, Site II 100b may be responsible for replicating production site data and may enable rollback of data of Site I 100a to an earlier point in time. Rollback may be used in the event of data corruption of a disaster, or alternatively in order to view or to access data from an earlier point in time.

As shown in FIG. 1, Site I 100a may include a source host 104, a source storage system (or "storage array") 108, and a source data protection appliance (DPA) 112 coupled via a first storage area network (SAN). Similarly, Site II 100b may include a target host 116, a target storage system 120, and a target DPA 124 coupled via a second SAN. In some embodiments, each SAN may include one or more devices (or "nodes") that may be designated an "initiator," a "target", or both. For example, the first SAN may include a first fiber channel switch 148 and the second SAN may include a second fiber channel switch 168. Communication links between each host 104 and 116 and its corresponding storage system 108 and 120 may be any appropriate medium suitable for data transfer, such as fiber communication channel links. A host may communicate with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

Each storage system 108 and 120 may include storage devices for storing data, such as disks or arrays of disks. Storage systems 108 and 120 may be target nodes. In order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. An LU is a logical entity provided by a storage system for accessing data stored therein. A logical unit may be a physical logical unit or a virtual logical unit, and may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. As such, LU B 156 may be generated as a copy of LU A 136. In one embodiment, LU B 156 may be configured so that its size is identical to the size of LU A 136.

Source host 104 may generate a host device 140 ("Device A") corresponding to LU A 136 and source host 116 may generate a host device 160 ("Device B") corresponding to LU B 156. A host device may be a logical entity within a host through which the host may access an LU. In some embodiments, an operating system of a host may generate a host device for each LU exposed by the storage system in the host SAN.

Source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

Source DPA 112 and target DPA 124 may perform various data protection services, such as data replication of a storage system, and journaling of I/O requests issued by hosts 104 and/or 116. When acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. Use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. The DPA cluster leader may coordinate between the computers in the cluster, and may also perform other tasks that require coordination between the computers, such as load balancing.

In certain embodiments, a DPA may be a standalone device integrated within a SAN. Alternatively, a DPA may be integrated into storage system. The DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, the DPAs may issue I/O requests using, for example, SCSI commands, to access LUs on their respective storage systems. Each DPA may also be configured with the necessary functionality to act as targets, e.g., to reply to I/O requests, such as SCSI commands, issued by other initiators in the SAN, including their respective hosts.

In some embodiments, being target nodes, the DPAs may dynamically expose or remove one or more LUs. As described herein, Site I 100a and Site II 100b may each behave simultaneously as a production site and a backup site for different logical units. As such, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. Protection agents 144 and 164 may intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands differently, according to the type of the command. For example, a SCSI command inquiring about the size of a certain LU may be sent directly to that LU, whereas a SCSI write command may be split and sent first to a DPA within the host's site.

A protection agent may change its behavior for handling SCSI commands, for example as a result of an instruction received from the DPA. For example, the behavior of a protection agent for a certain host device may depend on the behavior of its associated DPA with respect to the LU of the host device. When a DPA behaves as a source site DPA for a certain LU, then during normal course of operation, the associated protection agent may split I/O requests issued by a host to the host device corresponding to that LU. Similarly, when a DPA behaves as a target device for a certain LU, then during normal course of operation, the associated protection agent fails I/O requests issued by host to the host device corresponding to that LU.

Communication between protection agents 144 and 164 and a respective DPA 112 and 124 may use any protocol suitable for data transfer within a SAN, such as fiber channel, SCSI over fiber channel, or other protocols. The communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
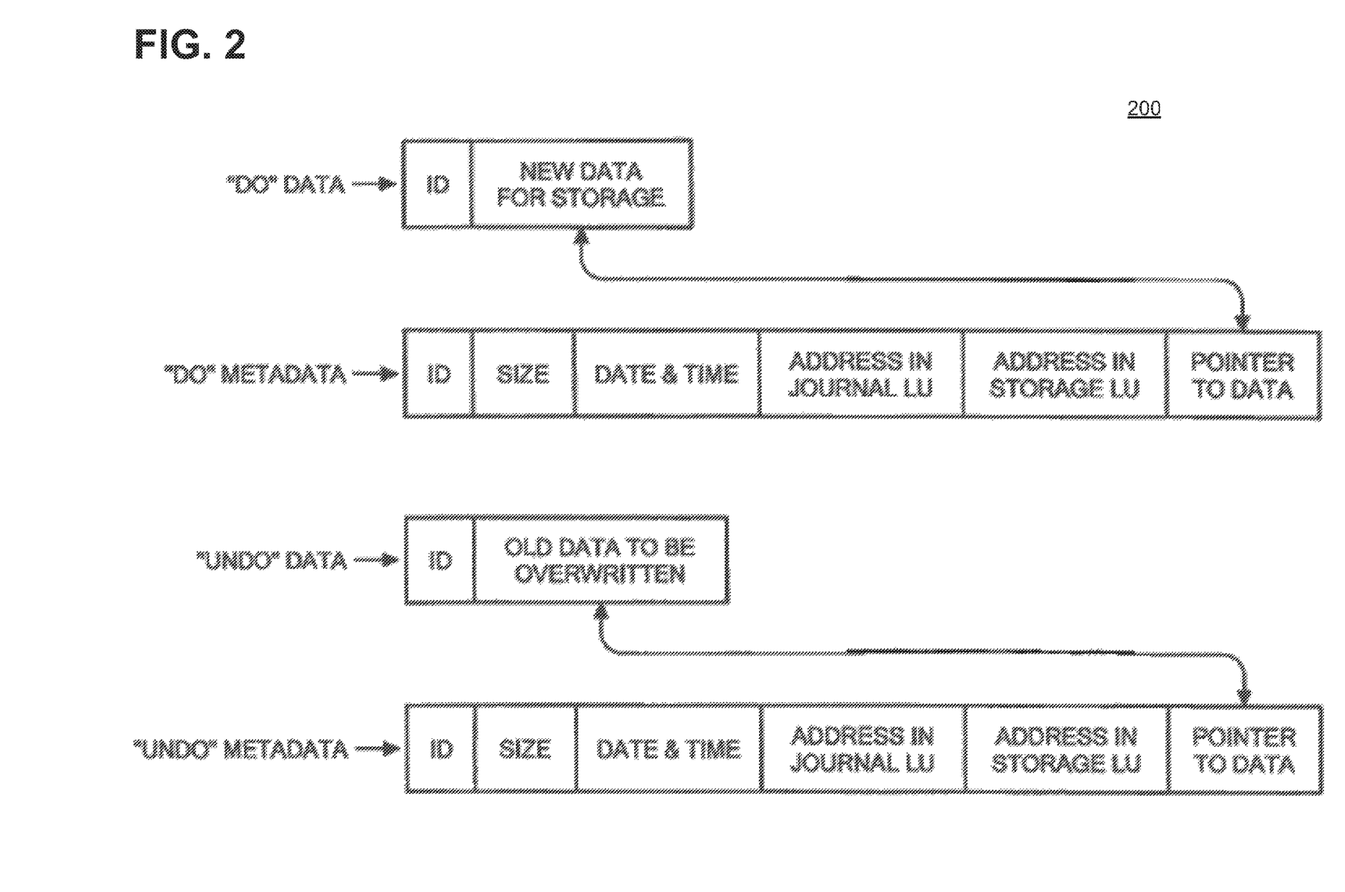
FIG. 2 is a diagram illustrating a journal history of write transactions for the data protection system of FIG. 1, in accordance with an illustrative embodiment.

As shown in the example embodiment shown in FIG. 1, target storage system 120 may expose a journal LU 176 for maintaining a history of write transactions made to LU B 156, referred to herein as a "journal." A journal may be used to provide access to storage at specified points-in-time (PITs), as discussed in greater detail in regard to FIG. 2. In some embodiments, the journal may be stored across multiple LUs (e.g., using striping, etc.). Target DPA 124 may include a journal processor 180 for managing the journal within journal LU 176.

In some embodiments, journal processor 180 may manage the journal entries of LU B 156. For example, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in U.S. Pat. No. 7,516,287, issued Apr. 7, 2009 and entitled "Methods and Apparatus for Optimal Journaling for Continuous Data Replication," which is hereby incorporated by reference herein. Other embodiments may not employ thin devices and tracking regions for replication, and may instead replicate write transactions using an array's native snapshot capabilities.

Some embodiments of data protection system 100 may be provided as physical systems for the replication of physical LUs, or as virtual systems for the replication of virtual LUs. For example, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In normal operation (sometimes referred to as "production mode"), described embodiments of DPA 112 may act as a source DPA for LU A 136. Thus, protection agent 144 may act as a source protection agent, specifically by splitting I/O requests to host device 140 ("Device A"). Protection agent 144 may send an I/O request to source DPA 112 and, after receiving an acknowledgement from source DPA 112, may send the I/O request to LU A 136. After receiving an acknowledgement from storage system 108, host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. When applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In synchronous mode, source DPA 112 may send each write transaction to target DPA 124, may receive back an acknowledgement from the target DPA 124, and in turn may send an acknowledgement back to protection agent 144. Protection agent 144 may wait until receipt of such acknowledgement before sending the I/O request to LU 136.

In asynchronous mode, source DPA 112 may send an acknowledgement to protection agent 144 upon receipt of each I/O request, before receiving an acknowledgement back from target DPA 124.

In snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. Source DPA 112 may send an acknowledgement to protection agent 144 upon receipt of each I/O request, before receiving an acknowledgement back from target DPA 124.

As described herein, a snapshot replica may be a differential representation of a volume. For example, the snapshot may include pointers to the original volume, and may point to log volumes for locations of the original volume that store data changed by one or more I/O requests. Snapshots may be combined into a snapshot array, which may represent different images over a time period (e.g., for multiple PITs).

As described herein, in normal operation, LU B 156 may be used as a backup of LU A 136. As such, while data written to LU A 136 by host 104 is replicated from LU A 136 to LU B 156, target host 116 should not send I/O requests to LU B 156. To prevent such I/O requests from being sent, protection agent 164 may act as a target site protection agent for host device B 160 and may fail I/O requests sent from host 116 to LU B 156 through host device B 160. In a recovery mode, target DPA 124 may undo the write transactions in journal LU 176 so as to restore the target storage system 120 to an earlier state.

Referring to FIG. 2, an illustrative write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, transaction 200 may correspond to a transaction transmitted from source DPA 112 to target DPA 124. In some embodiments, target DPA 124 may record write transaction 200 in the journal that includes four streams. For example, a first stream, referred to as a "DO" stream, may include a copy of the new data for writing to LU B 156. A second stream, referred to as a "DO METADATA" stream, may include metadata for the write transaction, such as an identifier, a date and time, a write size, the offset within LU B 156 where the new data is written, and a pointer to the offset in the DO stream where the corresponding data is located. A third stream, referred to as an "UNDO" stream, may include a copy of the data being overwritten within LU B 156 (referred to herein as the "old" data). A fourth stream, referred to as an "UNDO METADATA" stream, may include an identifier, a date and time, a write size, a beginning address in LU B 156 where data was (or will be) overwritten, and a pointer to the offset in the UNDO stream where the corresponding old data is located.

In such embodiments, since the journal contains the "undo" information necessary to rollback storage system 120, data that was stored in specific memory locations at a specified point in time may be obtained by undoing write transactions that occurred subsequent to such point in time (PIT). Each of the four streams may hold a plurality of write transaction data. As write transactions are received dynamically by the target DPA, the write transactions may be recorded at the end of the DO stream and the end of the DO METADATA stream, prior to performing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. Validating data replicas can be important, for example, in data replication systems employing incremental backup where an undetected error in an earlier data replica may lead to corruption of future data replicas.

In some conventional systems, validating data replicas can increase the journal lag for a transaction, which may increase a recovery time objective (RTO) of the data protection system (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Figure 3:
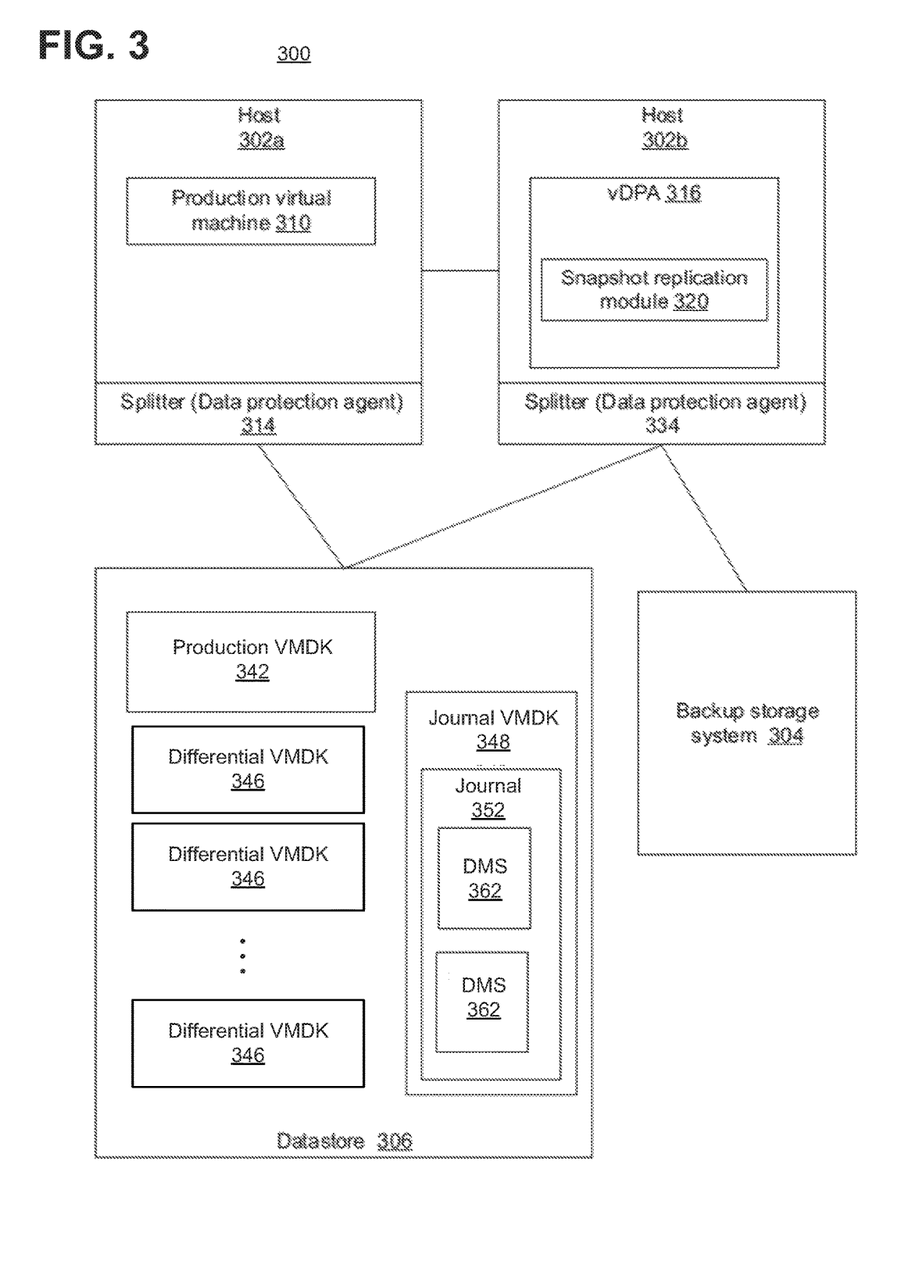
FIG. 3 is a block diagram of an example of a data protection system to perform snapshot replication on a storage system not configured to support snapshot replication, in accordance with an illustrative embodiment.

Referring to FIG. 3, in an illustrative embodiment, data protection system 300 may include host 302a, host 302b, backup storage system 304 (e.g., a deduplicated storage system) and a datastore 306. Host 302a may include production virtual machine 310 and splitter 314 (e.g., data protection agent 144 of FIG. 1). Host 302b may be a hypervisor and splitter 314 may operate either in the hypervisor kernel or in another layer in the hypervisor, which allows splitter 314 to intercept I/O requests sent from host 302a to one or more virtual machine disks (VMDKs) 342. Host 302b may include a virtual data protection appliance (e.g., DPA appliance 124 of FIG. 1) having snapshot replication module 320 and splitter 334 (e.g., data protection agent 164 of FIG. 1). Splitter 334 of host 302b enables protection of virtual machines on the host 302b. Splitter 334 of host 302b may also provide faster access to VMDKs 342 from virtual DPA (vDPA) 316.

As shown in FIG. 3, datastore 306 may include one or more production virtual machine disks, shown as production VMDK 342, and one or more differential virtual machine disks, shown as differential VMDKs 346. Some embodiments of datastore 306 may also include journal virtual machine disk 348. In other embodiments, differential VMDKs 346 and journal VMDK 348 may be stored in a first datastore, and production virtual machine disk 342 may be stored in a separate datastore so that I/O accesses to the differential VMDKs does not affect performance of the production VMDKs.

The differential VMDKs 346 may be used to store differential snapshot data representative of changes that happened to data stored on production VMDK 342. In one example, a first differential VMDK 346 may include changes due to writes that occurred to production VMDK 342 from time t1 to time t2, a second differential VMDK 346 may include the changes due to writes that occurred to production VMDK 342 from time t2 to time t3, and so forth.

In some embodiments, differential VMDKs 346 may be thin provisioned. In such embodiments, thin provisioning may allocate storage space to volumes of a SAN in a flexible manner among multiple volumes based on a minimum space requirement for each volume at any given time.

In some embodiments, data protection system 100 may include one or more consistency groups. A consistency group may treat source volumes (e.g., production volumes) and target volumes (e.g., backup volumes) as a single logical entity for data replication and migration.

Journal 352 may be stored in journal VMDK 348. In some embodiments, journal 352 includes one or more delta marker streams (DMS) 362. Each DMS 362 may include metadata associated with data that may be different between one differential VMDK and another differential VMDK. In one example, DMS 362 may include metadata differences between a current copy of the production VMDK 342 and a copy currently stored in backup storage 304. In some embodiments, journal 352 does not include the actual data changes, but rather metadata associated with the changes. In some embodiments, the data of the changes may be stored in the differential VMDKs. Thus, some embodiments may operate employing thin volumes to perform data replication by tracking regions for replications with the thin devices, as described herein. Other embodiments may operate to replicate data directly (e.g., without employing thin devices) from a source storage to a target (or replica) storage.

Although not shown in FIG. 3, in some embodiments, host 302b, datastore 306 and backup storage system 304 may be integrated into a single device, such as an integrated protection appliance to backup and protect production data.

As described here, data protection systems may employ continuous replication and/or snapshot replication to protect production data. For example, in continuous replication, every write I/O to a production volume is intercepted and sent to both the production volume and a replica volume. Thus, continuous replication may provide a very low Recovery Point Objective (RPO), meaning that data on a replica volume lags data on the production volume by only a short time period (e.g., a few seconds). RPO may be an amount of data that the user is willing to lose in case of production disaster (e.g., an amount of time between replications). At the extreme case, synchronous continuous replication may provide an RPO of zero (e.g., data on the replica volume is the same as data on the production volume). Further, continuous replication may provide high granularity of points in time (PITs) for restoring a production volume (e.g., since continuous replication may generate a replica each time there is a write operation to the production volume).

If there were numerous overwrites to the same region during a given snapshot interval, these changes may be "batched" or "folded" such that only the final content of the region is sent to the replica volume. In such embodiments, the bandwidth required for snapshot replication can be lower than then bandwidth required for continuous replication since less data is sent to the replica volume. However, this reduction in required bandwidth may be at the expense of providing longer RPOs than continuous replication and, thus, larger granularity of PITs that can be recovered (e.g., the lag between replicas may be large, for example, several minutes or hours). Further, snapshot replication may require storage space to track changes between snapshots and reading modified data from the production volume, which may delay user access to the production volume.

In continuous replication, data is sent to the replica "inline" (e.g., as part of the write operation), thus, in continuous replication it may be unnecessary to read data from the production volume to generate a replica. However, since every write operation sent to the production volume is also sent to the replica volume, network bandwidth requirements of continuous replication can be high (e.g., as high as the bandwidth of peak writes to the production volume).

In one type of snapshot replication, a periodic snapshot interval may be employed. In such embodiments, snapshot replicas of a production volume may periodically be generated after a time interval (e.g., the snapshot interval), and changes in data may be tracked between consecutive snapshot replicas. For example, in snapshot replication employing a fixed snapshot interval, one or more write operations may modify data on the production volume between generation of snapshot replicas (e.g., during the snapshot interval). Regions of the production volume that are modified, and the changed data written to the regions, may be tracked. When a new snapshot replica is generated, modified regions may be read from the production volume and sent to the replica volume. In such embodiments, the snapshot interval defines a minimum snap cycle such that when the snapshot interval expires, a new snapshot is created and the old snapshot is replicated. If replication ends faster than the snapshot interval, a new snapshot interval doesn't start immediately, instead not starting until the snapshot interval expires.

In another type of snapshot replication, snapshot replicas of a production volume may be generated after a given number of transactions (e.g., write operations) or a given amount of data are written to the production volume. Changes in data may be tracked between consecutive snapshot replicas. Unlike snapshot replication employing a fixed snapshot interval, snapshot replication based on given amounts of transactions or data may generate snapshot replicas asymmetrically (e.g., not at a periodic interval) since the number of transactions or amount of data may vary over time. Such an embodiment allows a user of the data protection system to configure recovery time objective (RTO) in terms of an amount of data or number of transactions. When a lag between sites reaches a defined threshold of data or transactions, then a snapshot replica is generated.

In a third type of snapshot replication, a continuous snapshot interval may be employed. In such embodiments, whenever a snapshot interval ends, a new snapshot interval begins. Continuous snapshot replication can provide smaller RPO, shorter snapshot intervals, and higher granularity of recoverable points in time, based on the capabilities of the data protection system. However, continuous snapshot replication can excessively load components of the data protection system (e.g., consume communication bandwidth, processing capability, more frequent reads from the production volume, etc.).

In conventional systems, the type of snapshot replication employed is pre-configured by a user of the data protection system and, thus, does not provide flexibility to adjust to the changing nature of the workload and/or operating conditions of the data protection system. Thus, some described embodiments may dynamically adapt the snapshot interval of the data protection system based upon one or more properties of the production and/or replication volumes and/or one or more operating conditions of the data protection system.

As will be described, in some embodiments, the snapshot interval may not be a fixed time interval or based upon a predetermined amount of data or number of write transactions to the production volume. Rather, described embodiments may adjust the snapshot interval automatically based upon one or more properties of the production and/or replication volume, and a current workload of the data protection system. Thus, described embodiments may automatically adjust the RPO and/or RTO of the data protection system to achieve a best point in time (PIT) granularity that can be provided by the data protection system, as determined by the capabilities of components of the data protection system and a current workload of the data protection system.

For example, the one or more properties of the production and/or storage volumes may be based upon theoretical limits or manufacturers specifications for the production and/or storage volumes, such as a maximum storage amount of the volume, a maximum data throughput of the volume, a cache size of the volume, or other properties of the volume(s). In some embodiments, an application programming interface (API) may periodically check the properties of the volume(s), since some properties may change over time. For example, a maximum storage amount of the volume may change over time as sectors or blocks of memory fail (e.g., due to wear, physical damage, etc.). Further, described embodiments may periodically (or in real-time) determine operating conditions (e.g., related to workload) of the production volume and/or replication volume. Thus, described embodiments dynamically update and adapt the snapshot interval to provide a shortest snapshot interval period and highest PIT granularity that the data protection system can provide based upon maximum component capabilities and current operating conditions.

For example, described embodiments may determine a change rate that a given replication site can handle, for example based upon the determined volume properties and current operating conditions. If the snapshot interval is too short, then the change rate that is being replicated may exceed the change rate that can be handled by the replication site. When the supported change rate of the replication site is exceeded, garbage collection of the replication site may fall behind, causing a decrease in the global deduplication ratio of the replication site (e.g., the replication site may contain increasing amounts of duplicate data and require more storage space than if garbage collection was able to deduplicate the replication site).

Further, if the data protection system workload is high and the snapshot interval is too short, then internal memory objects of the replication site may accumulate without being freed to process subsequent snapshots, which can eventually lead to delays in snapshot replication and missing the RPO. By monitoring the state of the production and/or replication volumes in real time (or at determined time intervals), the data protection system can automatically choose snapshot intervals that are as short as possible without overloading the data protection system.

In some embodiments, the snapshot interval for one or more consistency groups (CGs) of the data protection system may be determined. The CGs associated with a given I/O may be determined based upon a volume associated with each I/O. For a given I/O, capabilities of the volumes of the associated CG may be determined. In some embodiments, the capabilities of the volume may be expressed as a change rate capability of the volumes in a given time period (e.g. 5% data change rate per day for a specific volume or CG). The capabilities of the volume may be determined by a user of the data protection system entering in properties of the volume, or may be determined by querying the volumes. For example, the query may return a theoretical change rate limit (e.g. getMaximumSupporteChangeRate) or may return a current state of the volume (e.g. getCurrentAvailableMaximumChangeRate). Further, the priority of each CG may be determined.

The data protection system determines an expected change rate per CG for a desired period of time, to determine a snapshot interval to apply for every CG to provide snapshot intervals that are as short as possible without overloading the data protection system, while also providing shorter snapshot intervals to higher priority CGs.

Figure 4:
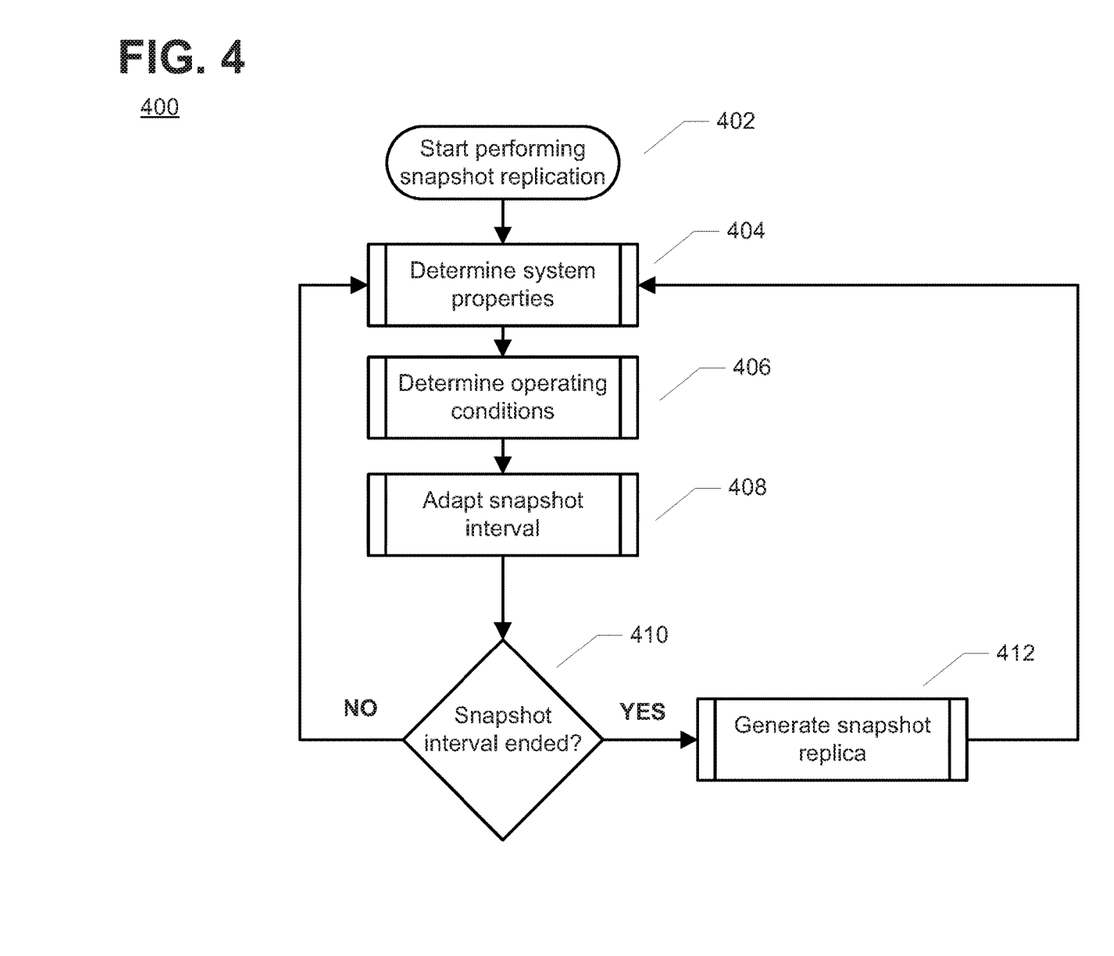
FIG. 4 is a flow diagram of an illustrative process to perform snapshot replication for a production volume of a data protection system, in accordance with an illustrative embodiment.

Referring to FIG. 4, a flowchart is shown for an illustrative process, 400, for performing snapshot replication from a production volume to a replication volume. In some embodiments, process 400 may be performed by the protection agent (e.g., protection agent 144 of FIG. 1, or DPA 314 of FIG. 3) associated with the production volume. Process 400 may be independently performed concurrently (e.g., in parallel) for each of a plurality of consistency groups (CGs) of data protection system 100.

Referring back to FIG. 4, at block 402, process 400 begins. In some embodiments, at block 404, the protection agent may determine one or more system properties of the data protection system (e.g., data protection system 100). In some embodiments, block 404 may be performed periodically, for example during each of a plurality of snapshot intervals of data protection system 100. In other embodiments, block 404 may be performed at an interval separate from the snapshot interval, for example once per every multiple of snapshot intervals. Block 404 will be described in greater detail in regard to FIG. 5.

At block 406, the protection agent may determine one or more operating conditions of data protection system 100. In some embodiments, block 406 may be performed during each of a plurality of snapshot intervals of data protection system 100 (e.g., to determine real-time operating conditions of the data protection system). Block 406 will be described in greater detail in regard to FIG. 6. At block 408, the data protection agent may adapt the snapshot interval of a given consistency group (CG) of data protection system 100. For example, each CG may have a snapshot interval that is set independently of the snapshot intervals for other CGs. At block 410, if the snapshot interval for a given CG has ended, then at block 412, a snapshot replica is generated for the given CG (e.g., by reading changed data from the production volumes) and the snapshot replica is sent to the replication volume(s). Process 400 may return to block 404 to process subsequent I/Os and re-adapt the snapshot interval for the given CG. Process 400 may continue to operate until data protection system 100 is shut down.

At block 410, if the snapshot interval has not yet ended, process 400 may return to block 404 to process subsequent I/Os and re-adapt the snapshot interval for the given CG.

Figure 5:
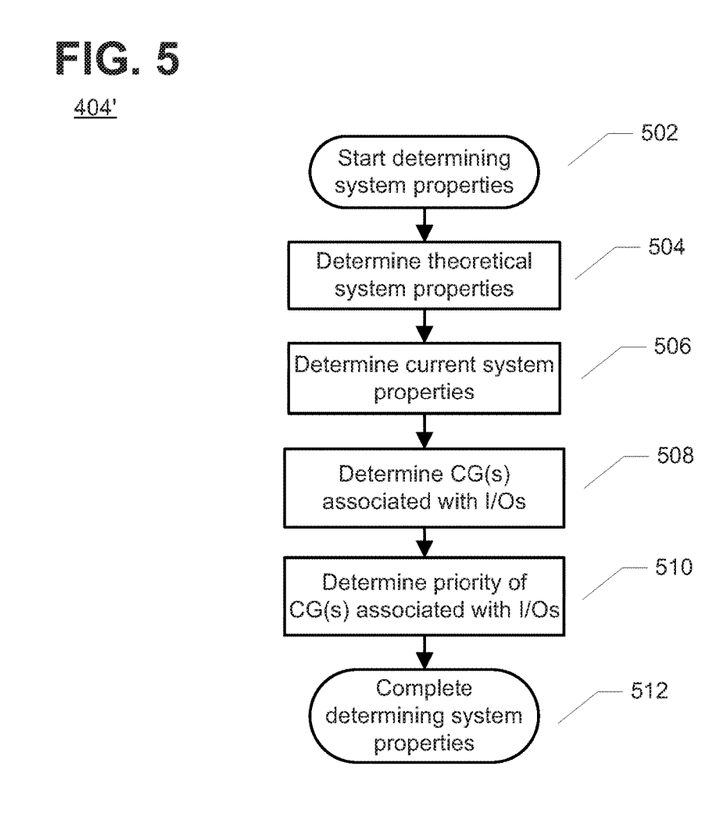
FIG. 5 is a flow diagram of an illustrative process to determine system properties of the data protection system, in accordance with an illustrative embodiment.

Referring to FIG. 5, process 404' is an example of a process to determine system properties of data protection system 100 (e.g., block 404 of FIG. 4). At block 502, process 404' begins. At block 504, one or more theoretical properties of data protection system 100 may be determined. For example, as described herein, the one or more theoretical properties may include a maximum storage amount of the production volume(s) and/or replication volume(s), a maximum data throughput of the production volume(s) and/or replication volume(s), a maximum change rate supported by the production volume(s) and/or replication volume(s) during a given time period, a maximum processing rate of processor(s) associated with the production volume(s) and/or replication volume(s), or other properties of the production volume(s) and/or replication volume(s), such as manufacturer specifications for the production volume(s) and/or replication volume(s). As described herein, the production volume(s) and replication volume(s) may be implemented as arrays of volumes, and the properties may also include properties of the arrays, such as redundancy or RAID level, etc.

At block 506, one or more current system properties of data protection system 100 may be determined. For example, as described herein, system properties may change over time (e.g., less storage space due to failed sectors or blocks, lower processing rate due to temperature of the system, etc.). At block 508, a consistency group (CG) associated with each I/O received during the snapshot interval is determined. At block 510, a priority level of each CG associated with an I/O is determined. At block 512, process 404' completes.

Figure 6:
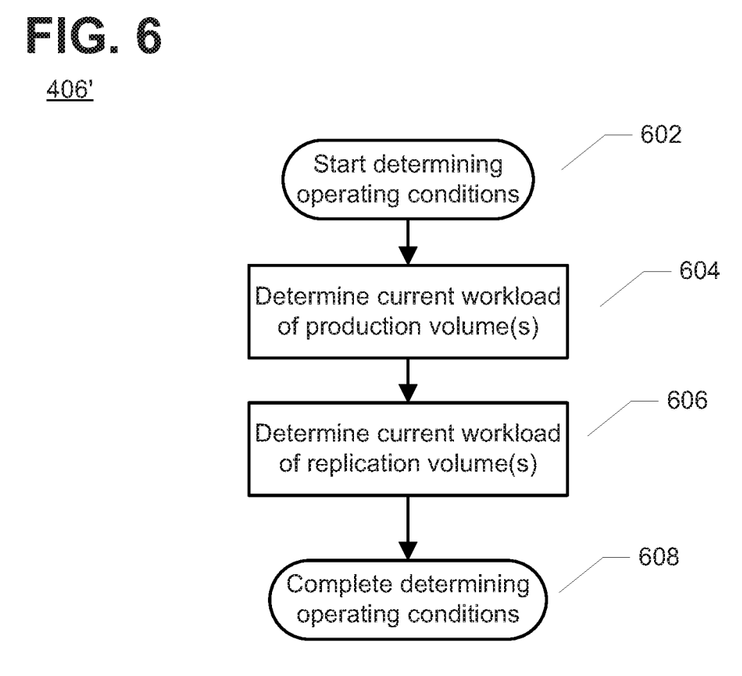
FIG. 6 is a flow diagram of an illustrative process to determine operating conditions of the data protection system, in accordance with an illustrative embodiment.

Referring to FIG. 6, process 406' is an example of a process to determine operating conditions of data protection system 100 (e.g., block 406 of FIG. 4). At block 602, process 406' begins. At block 604, a current workload of the production volume(s) may be determined. For example, the workload may be determined based upon a current processor capacity, a current amount of data being written, a current storage space availability, a current number of I/Os to be processed, or other similar characteristics. At block 606, a current workload of the replication volume(s) may be determined. For example, the workload may be determined based upon a current processor capacity, a current amount of data being written, a current storage space availability, a current number of I/Os to be processed, or other similar characteristics. At block 608, process 406' completes.

Figure 7:
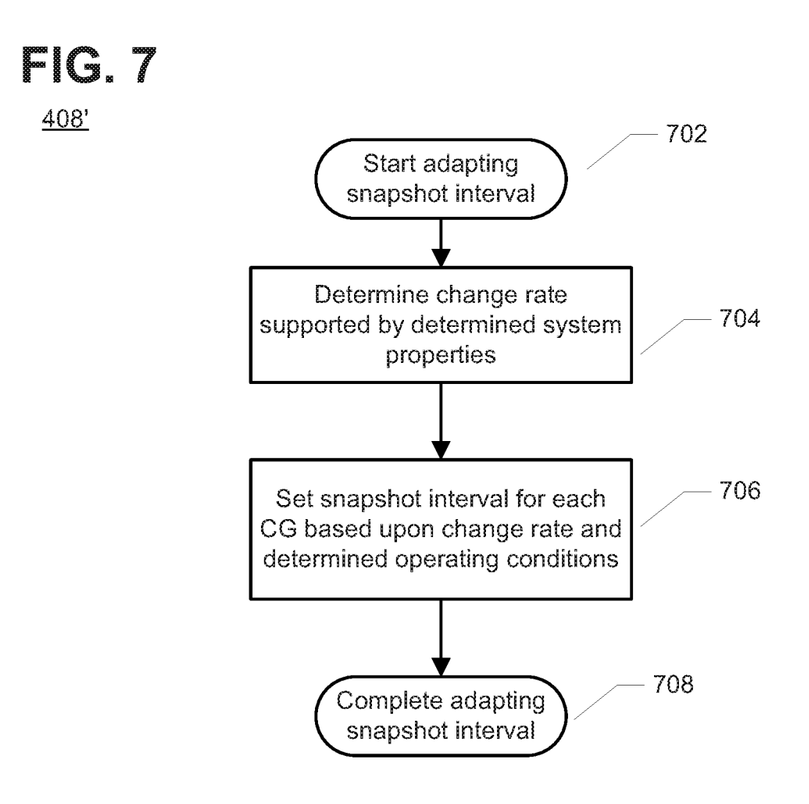
FIG. 7 is a flow diagram of an illustrative process to adapt a snapshot interval of the data protection system, in accordance with an illustrative embodiment.

Referring to FIG. 7, process 408' is an example of a process to determine operating conditions of data protection system 100 (e.g., block 408 of FIG. 4). At block 702, process 408' begins. At block 704, the data protection agent may determine a change rate supported by the current and/or theoretical properties of the data protection system (e.g., as determined at block 404 of FIG. 4). At block 706, the data protection agent may adapt or set a snapshot interval for each CG based upon the determined change rate and the determined operating conditions (e.g., at block 406 of FIG. 4). For example, the data protection agent may increase (e.g., lengthen) the snapshot interval if current system conditions would not support the determined change rate, or may decrease (e.g., shorten) the snapshot interval if current system conditions support the determined change rate. At block 708, process 408' completes.

Figure 8:
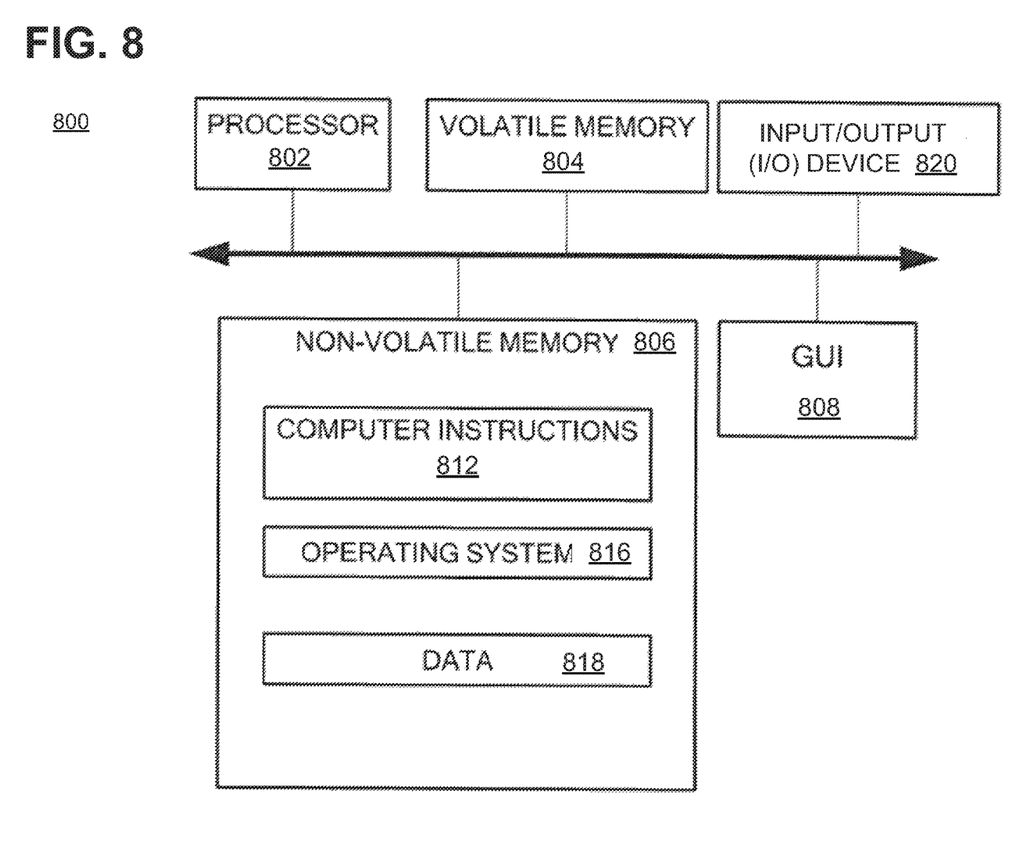
FIG. 8 is a block diagram of an example of a hardware device that may perform at least a portion of the processes in FIGS. 4-7, in accordance with an illustrative embodiment.

In some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 8. As shown in FIG. 8, computer 800 may include processor 802, volatile memory 804 (e.g., RAM), non-volatile memory 806 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the processes shown in FIGS. 4-6. Program code may be applied to data entered using an input device of GUI 808 or received from I/O device 820.

Processes 400, 404' and 600 (FIGS. 4-6) are not limited to use with the hardware and software of FIG. 8 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, processes 400, 404' and 600 are not limited to the specific processing order shown in FIGS. 4-6. Rather, any of the blocks of the processes may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
receiving write requests to be written to a production volume of a storage system during a snapshot interval;
determining one or more system properties associated with at least one of the storage system and the received write requests, the one or more system properties including one or more maximum system properties of at least one component of the storage system, wherein the one or more maximum system properties includes a maximum change rate supported by the production volume and/or replication volume during a given time period;
determining one or more current system properties of at least one component of the storage system;
determining one or more operating conditions of the storage system;
based, at least in part, upon the determined one or more system properties and the determined one or more operating conditions, adapting the snapshot interval; and
at completion of the snapshot interval, generating a snapshot replica from data of the production volume and the received write requests, and sending the snapshot replica to a replication volume of the storage system.

2. The method of claim 1, wherein:
the one or more maximum system properties comprise at least one of: a maximum storage amount of the production volume and/or replication volume, a maximum data throughput of the production volume and/or replication volume, and a maximum processing rate of processors associated with the production volume and/or replication volume; and
the one or more current system properties comprise at least one of: a current storage amount of the production volume and/or replication volume, a current data throughput of the production volume and/or replication volume, a current change rate supported by the production volume and/or replication volume during a given time period, and a current processing rate of processors associated with the production volume and/or replication volume.

3. The method of claim 1, further comprising:
determining the one or more maximum system properties and the one or more current system properties by querying at least one of the production volume and the replication volume.

4. The method of claim 1, further comprising:
determining a current workload of at least one of the production volume and the replication volume.

5. The method of claim 1, further comprising:
determining a consistency group associated with each received write request; and
determining a priority level of each consistency group.

6. The method of claim 5, further comprising:
adapting the snapshot interval for each consistency group based upon the determined one or more system properties, the determined one or more operating conditions, and the determined priority level of each consistency group;
wherein determining the consistency group associated with each received write request is based on a volume associated with the received write request; and
for the received write request, determining capabilities of the volume, the capabilities of the volume expressed as a change rate capability in a selected time period, the capabilities of the volume including at least one of a theoretical change rate limit and a current state of the volume.

7. A system comprising:
a processor; and
memory storing computer program code that when executed on the processor causes the processor to operate a storage system, the storage system operable to perform the operations of:
receiving write requests to be written to a production volume of the storage system during a snapshot interval;
determining one or more system properties associated with at least one of the storage system and the received write requests, the one or more system properties including one or more maximum system properties of at least one component of the storage system, wherein the one or more maximum system properties includes a maximum change rate supported by the production volume and/or replication volume during a given time period;
determining one or more current system properties of at least one component of the storage system;
determining one or more operating conditions of the storage system;
based, at least in part, upon the determined one or more system properties and the determined one or more operating conditions, adapting the snapshot interval; and
at completion of the snapshot interval, generating a snapshot replica from data of the production volume and the received write requests, and sending the snapshot replica to a replication volume of the storage system.

8. The method of claim 6, wherein adapting the snapshot interval for each consistency group further comprises providing a shortened snapshot interval to consistency groups designated as high priority.

9. The system of claim 7, wherein:
the one or more maximum system properties comprise at least one of: a maximum storage amount of the production volume and/or replication volume, a maximum data throughput of the production volume and/or replication volume, and a maximum processing rate of processors associated with the production volume and/or replication volume; and
the one or more current system properties comprise at least one of: a current storage amount of the production volume and/or replication volume, a current data throughput of the production volume and/or replication volume, a current change rate supported by the production volume and/or replication volume during a given time period, and a current processing rate of processors associated with the production volume and/or replication volume.

10. The system of claim 7, wherein the storage system is further operable to perform the operations of:
determining the one or more maximum system properties and the one or more current system properties by querying at least one of the production volume and the replication volume.

11. The system of claim 7, wherein the storage system is further operable to perform the operations of:
determining a current workload of at least one of the production volume and the replication volume.

12. The system of claim 7, wherein the storage system is further operable to perform the operations of:
- determining a consistency group associated with each received write request;
- determining a priority level of each consistency group; and
- adapting the snapshot interval for each consistency group based upon the determined one or more system properties, the determined one or more operating conditions, and the determined priority level of each consistency group;
- wherein determining the consistency group associated with each received write request is based on a volume associated with the received write request; and
- for the received write request, determining capabilities of the volume, the capabilities of the volume expressed as a change rate capability in a selected time period, the capabilities of the volume including at least one of a theoretical change rate limit and a current state of the volume.

13. The system of claim of claim 12, wherein adapting the snapshot interval for each consistency group further comprises providing a shortened snapshot interval to consistency groups designated as high priority.

14. A computer program product including a non-transitory computer readable storage medium having computer program code encoded thereon that when executed on a processor of a computer causes the computer to operate a storage system, the computer program product comprising:
- computer program code for receiving write requests to be written to a production volume of the storage system during a snapshot interval;
- computer program code for determining one or more system properties associated with at least one of the storage system and the received write requests the one or more system properties including one or more maximum system properties of at least one component of the storage system, wherein the one or more maximum system properties includes a maximum change rate supported by the production volume and/or replication volume during a given time period;
- computer program code for determining one or more current system properties of at least one component of the storage system;
- computer program code for determining one or more operating conditions of the storage system;
- computer program code for adapting, based, at least in part, upon the determined one or more system properties and the determined one or more operating conditions, the snapshot interval; and
- computer program code for, at completion of the snapshot interval, generating a snapshot replica from data of the production volume and the received write requests, and sending the snapshot replica to a replication volume of the storage system.

15. The computer program product of claim 14, wherein:
- the one or more maximum system properties comprise at least one of: a maximum storage amount of the production volume and/or replication volume, a maximum data throughput of the production volume and/or replication volume, and a maximum processing rate of processors associated with the production volume and/or replication volume; and
- the one or more current system properties comprise at least one of: a current storage amount of the production volume and/or replication volume, a current data throughput of the production volume and/or replication volume, a current change rate supported by the production volume and/or replication volume during a given time period, and a current processing rate of processors associated with the production volume and/or replication volume.

16. The computer program product of claim 14, further comprising:
- computer program code for determining the one or more maximum system properties and the one or more current system properties by querying at least one of the production volume and the replication volume.

17. The computer program product of claim 14, further comprising:
- computer program code for determining a current workload of at least one of the production volume and the replication volume.

18. The computer program product of claim 14, further comprising:
- computer program code for determining a consistency group associated with each received write request;
- computer program code for determining a priority level of each consistency group; and
- computer program code for adapting the snapshot interval for each consistency group based upon the determined one or more system properties, the determined one or more operating conditions, and the determined priority level of each consistency group;
- wherein determining the consistency group associated with each received write request is based on a volume associated with the received write request; and
- for the received write request, determining capabilities of the volume, the capabilities of the volume expressed as a change rate capability in a selected time period, the capabilities of the volume including at least one of a theoretical change rate limit and a current state of the volume.

19. The computer program product of claim 18, wherein adapting the snapshot interval for each consistency group further comprises providing a shortened snapshot interval to consistency groups designated as high priority.

* * * * *